United States Patent
Byrne (10) Patent No.: US 11,043,217 B2
(45) Date of Patent: Jun. 22, 2021

(54) VOICE ASSISTANT FOR RECORDS

(71) Applicant: FinancialForce.com, Inc., San Francisco, CA (US)

(72) Inventor: Matthew Byrne, San Francisco, CA (US)

(73) Assignee: FinancialForce.com, Inc., San Francisco, CA (US)

( * ) Notice: Subject to any disclaimer, the term of this patent is extended or adjusted under 35 U.S.C. 154(b) by 99 days.

(21) Appl. No.: 16/240,457

(22) Filed: Jan. 4, 2019

(65) Prior Publication Data

US 2019/0392828 A1   Dec. 26, 2019

Related U.S. Application Data (60) Provisional application No. 62/689,667, filed on Jun. 25, 2018.

(51) Int. Cl.
| | |
|---|---|
| G10L 21/06 | (2013.01) |
| G10L 15/22 | (2006.01) |
| G06F 3/16 | (2006.01) |
| G06F 16/9032 | (2019.01) |

(52) U.S. Cl.
CPC ............. G10L 15/22 (2013.01); G06F 3/167 (2013.01); G06F 16/90332 (2019.01); *G10L 2015/223* (2013.01)

(58) Field of Classification Search
CPC ... G10L 15/22; G06F 16/90332; G06F 3/167; G06F 17/2785
USPC ..... 379/88.01–88.04, 88.17, 88.18; 704/275; 1/1
See application file for complete search history.

(56) References Cited

U.S. PATENT DOCUMENTS

| | | | |
|---|---|---|---|
| 8,675,842 B2 * | 3/2014 | Franklin-Barr | H04M 1/64 379/100.03 |
| 10,224,035 B1 * | 3/2019 | Koenig | G10L 15/22 |
| 10,276,185 B1 * | 4/2019 | Ma | G10L 25/78 |
| 2005/0069103 A1 * | 3/2005 | DiVenuta | G06Q 50/22 379/88.18 |
| 2017/0293610 A1 * | 10/2017 | Tran | G06F 17/2785 |

* cited by examiner

*Primary Examiner* — Md S Elahee
(74) *Attorney, Agent, or Firm* — Kokka & Backus, PC (57) ABSTRACT

A voice assistant device can be used by a user to have a conversation to retrieve or generate database records.

17 Claims, 5 Drawing Sheets

VOICE ASSISTANT FOR RECORDS

CLAIM FOR PRIORITY

This application claims priority to U.S. Provisional Patent Application No. 62/689,667, entitled "Voice Assistant for Records," by Byrne, and filed on Jun. 25, 2018. The content of the above-identified application is incorporated herein by reference in its entirety.

TECHNICAL FIELD

This disclosure relates to voice assistants, and in particular a voice assistant for querying or generating database records.

BACKGROUND

Cloud platforms such as the SALESFORCE platform (provided by Salesforce.com, Inc.) allow for sharing processing resources and data in a multi-tenant network that offers computing services on demand to customers. Cloud computing enables ubiquitous, on-demand access to a shared pool of configurable computing resources (e.g., networks, servers, storage, applications, and services), which can be rapidly provisioned and released with minimal management effort. For example, the SALESFORCE platform can provide numerous companies with an environment to deploy applications.

SUMMARY

Some of the subject matter described herein includes a method including receiving a first voice data indicative of speech provided to an assistant device, the speech requesting first information stored in a database record; determining a first request type based on the first information, the first request type indicative of a type of data that the speech is requesting; generating, by a processor, a first query data for requesting the first information stored in the database record based on the first request type, the first query data referencing the database record storing the first information; providing the first query data to a database server storing the database record; receiving a first record data from the database server providing the first information; and providing the first information to the assistant device for voice playback in response to the request for the first information.

Some of the subject matter described herein also includes an electronic device including one or more processors; and memory storing instructions, wherein the processor is configured to execute the instructions such that the processor and memory are configured to: receive a first voice data indicative of speech provided to an assistant device, the speech requesting first information stored in a database record; determine a first request type based on the first information, the first request type indicative of a type of data that the speech is requesting; generate a first query data for requesting the first information stored in the database record based on the first request type, the first query data referencing the database record storing the first information; provide the first query data to a database server storing the database record; receive a first record data from the database server providing the first information; and provide the first information to the assistant device for voice playback in response to the request for the first information.

Some of the subject matter described herein also includes a computer program product including one or more non-transitory computer-readable media storing computer program instructions, execution of which by a processing system causes the processing system to perform operations comprising: receive a first voice data indicative of speech provided to an assistant device, the speech requesting first information stored in a database record; determine a first request type based on the first information, the first request type indicative of a type of data that the speech is requesting; generate a first query data for requesting the first information stored in the database record based on the first request type, the first query data referencing the database record storing the first information; provide the first query data to a database server storing the database record; receive a first record data from the database server providing the first information; and provide the first information to the assistant device for voice playback in response to the request for the first information.

DETAILED DESCRIPTION

This disclosure describes devices and techniques for a voice assistant for accessing or generating database records. In one example, a multi-tenant database system can store database records providing information for a business, for example, sales records, business performance records, etc. In some scenarios, users might access the database records by using a graphical user interface (GUI) implemented in a web browser or software application. The user can use the GUI by filling in fields, selecting buttons, or manipulating other elements of the GUI using a computer mouse, touchscreen, or other physical interactive device.

As described herein, rather than using the GUI, the database records can be accessed or generated using a voice assistant device. The voice assistant device can receive voice data from a user providing spoken speech. The voice data can then be translated into text and provided to an access server which can form a query for information related to the database records. That query can be provided to the multi-tenant database system, the requested data can be provided back to the access server, and the requested data can be provided to the voice assistant device. The voice assistant device can then provide a response to the user's spoken speech in a generated computerized speech. Thus, a user can have a conversation with the voice assistant device to access or generate records rather than using the GUI.

By being able to use the voice assistant device, users can more easily be able to access or generate records. Additionally, visually impaired (e.g., blind) users can access or generate the records that the users would otherwise be unable to access or generate with the GUI.

Figure 1:
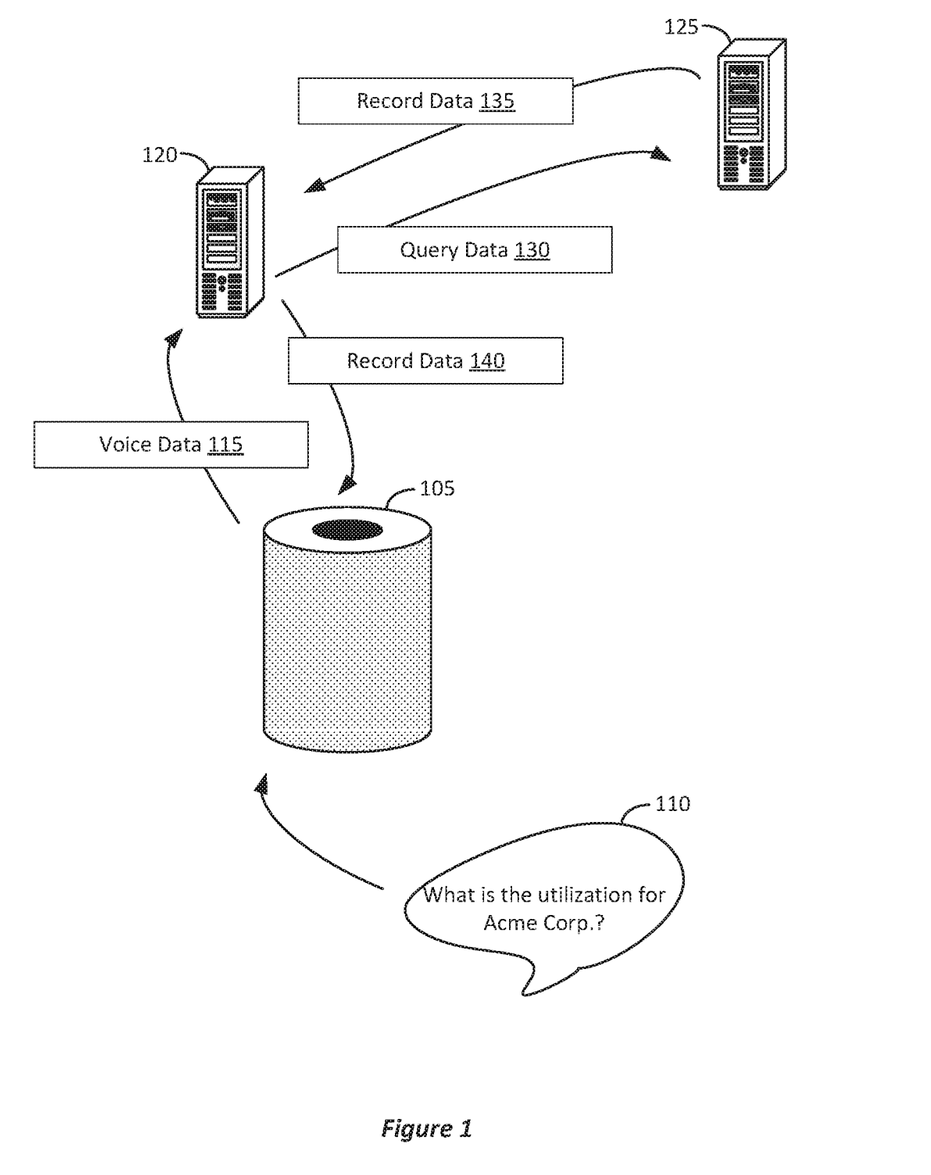
FIG. 1 illustrates an example of using a voice assistant to access or generate records.

In more detail, FIG. 1 illustrates an example of using a voice assistant to access or generate records. In FIG. 1, assistant device 105 can be an electronic device with artificial intelligence (AI) capabilities with a microphone that can receive voice (or speech) spoken within the environment using the microphone. Assistant device 105 can, either by itself or with another server paired with assistant device 105, translate the speech spoken in the environment to text.

For example, in FIG. 1, speech 110 can be a request regarding business information stored in a database record of records server 125. Assistant device 105 can translate speech 110 into text and provide the text as voice data 115 to access server 120. In some implementations, voice data 115 can include the text regarding speech 110 as well as other information such as user name or other types of authentication credentials for the user.

Access server 120 can receive voice data 115 and then generate query data 130 to be provided to records server 125. Query data 130 can be a request (e.g., using text, numbers, etc. rather than voice data) for the information requested by the user via speech 110, but in a format that is understandable and usable by records database 125.

For example, based on the text of speech 110 provided via voice data 115, access server 120 can determine a request type for speech 110. The request type can indicate the type of data that the user is seeking and, based on that type of data, which database records stored within access server 120 should be searched. Based on the request type, access server 120 can determine that the query for that type of data can include one or more variables that should be included in translated text from speech 110. For example, if speech 110 includes the user asking "What is the utilization for Acme Corporation?" then access server 120 can determine that the request type is a search for a business-related record. Additionally, by looking up information stored within or accessible by access server 120 (e.g., in a database), access server 120 can determine that a request for a business-related record should have a variable. That is, speech 110 and, therefore also voice data 115, should include a variable used to form query data 135. In FIG. 1, this can be "Acme Corporation." Thus, a request for a key performance indicator (KPI) such as utilization business records is the request type and Acme Corporation can be a variable for that request (i.e., that the utilization business records of Acme Corporation should be requested from records server 125).

Thus, in FIG. 1, access server 120 can generate query data 130 with the request type and variable. Query data 130 can be generated by access server 120 to be in a format that is used by records database 125. Upon receiving query data 130, records database can query to appropriate databases and generate record data 135 as a response providing the answer to the user's speech 110.

Access server 120 can receive record data 135 and then provide record data 140. Record data 140 can include the information provided within record data 135 (e.g., the utilization for Acme Corporation), but formatted in a conversational format for assistant device 105 to translate from text into speech for the user to listen to via a speaker of assistant device 105. For example, record data 135 can include a percentage (e.g., seventy-five percent) as the answer to query data 130. Access server 120 can then provide a response based on the response type that includes record data 135. For example, record data 140 can include text indicating that assistant device 105 should generate speech using a speaker providing audio output that "The utilization for Acme Corporation is seventy-five percent." Thus, based on record data 135 and voice data 115, access server 120 can be used to provide a voice response to speech 110. Thus, the user can receive information from records server 125 by having a conversation with assistant device 105 rather than via a GUI.

In some implementations, records server 125 can be a platform (e.g., a SALESFORCE platform) that is accessible by assistant device 105 via a bridge implemented by access server 120.

Figure 2A:
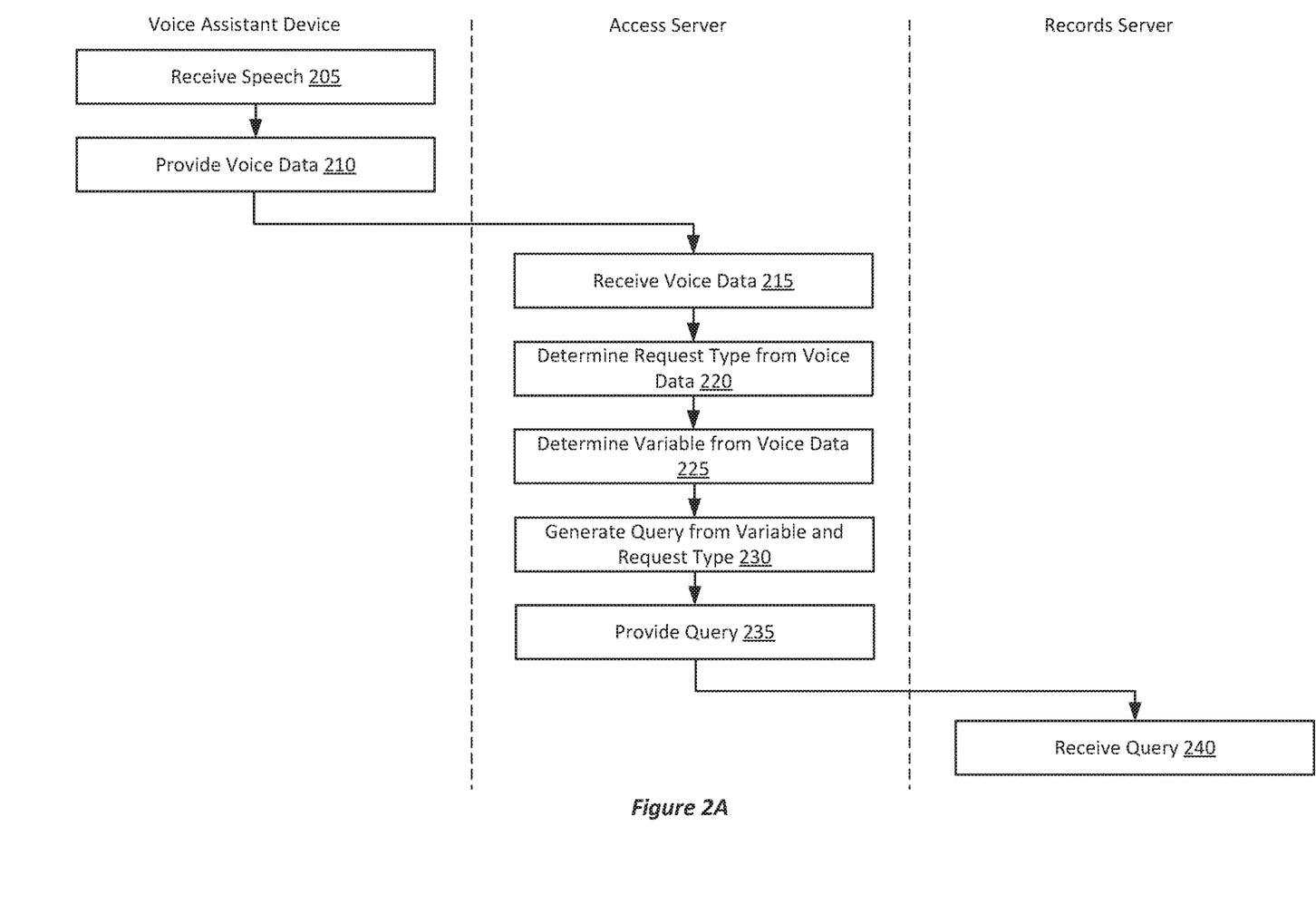
FIGS. 2A and 2B illustrate an example of a block diagram for using a voice assistant to access or generate records.

FIGS. 2A and 2B illustrate an example of a block diagram for using a voice assistant to access or generate records. In FIG. 2A, a voice assistant device can receive speech (205). For example, in FIG. 1, assistant device 105 can detect or determine that speech 110 was spoken in its environment using a microphone. The voice data can then be provided to an access server (210). For example, the voice data can be provided by assistant device 105 to another server to have speech 110 translated into textual content (i.e., determine the content spoken by the user providing speech 110) or speech 110 can be translated into textual content by assistant device 105 without the use of another server. The access server can then receive the voice data (215) and determine a request type from the voice data (220) and variables from the voice data (225). Using the request type and the voice data, the access server can then generate a query for the records database to use to query the relevant databases for the requested information (230). The query can then be provided to the records server (235). For example, in FIG. 1, query data 130 can be provided to records database 125.

Figure 2B:
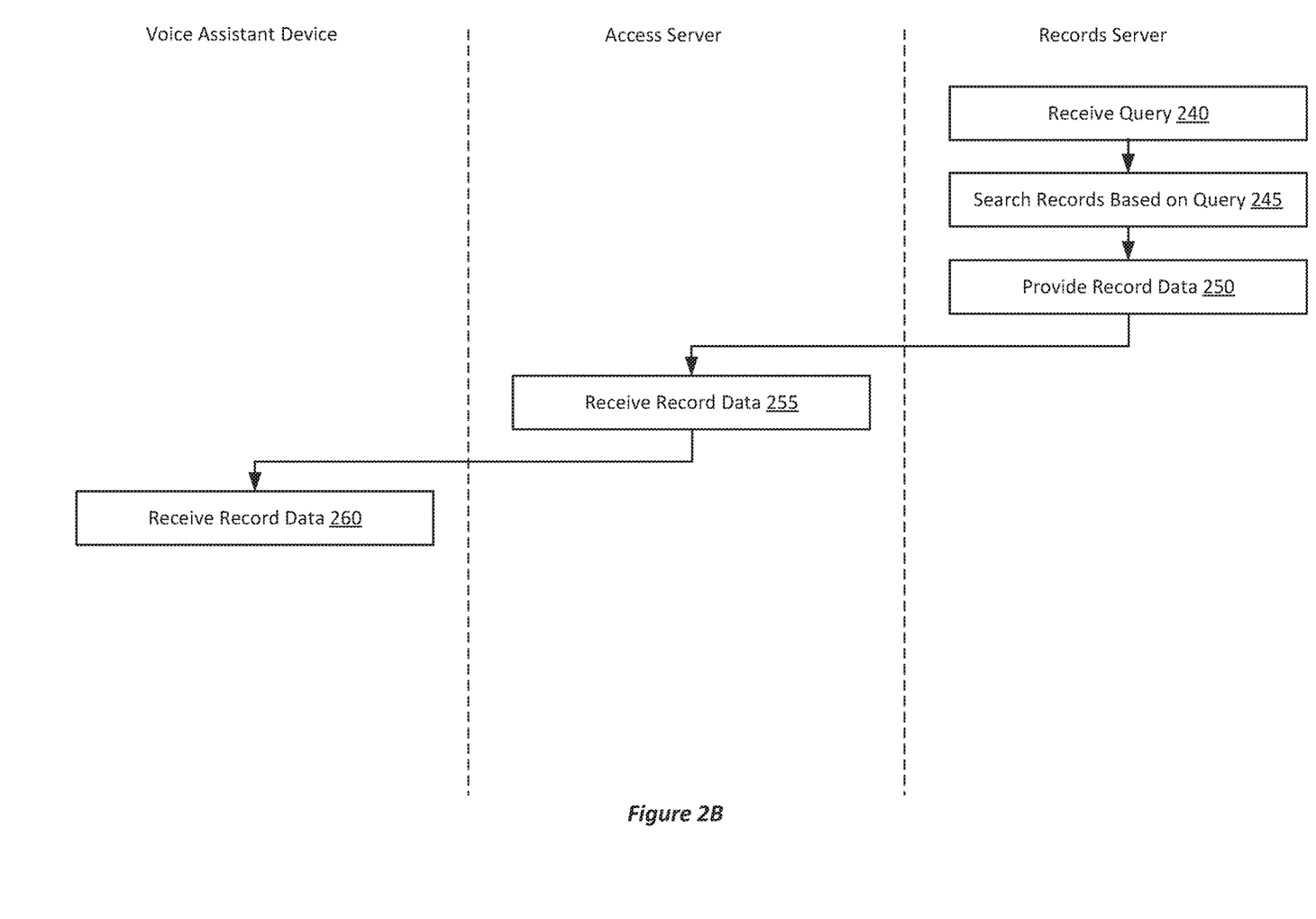

The records server can receive the query (240) and then search one or more databases based on the query (245). For example, the query might indicate that the records database should provide information related to a business or sales metric. This data can then be determined by the records server and then provided to the access server (255). The access server can then provide the records data to the assistant device (260). The records data can be in a textual format that the assistant device can analyze and generate a voice output providing an answer to the speech using the records data.

In some implementations, the user can have a back-and-forth conversation with assistant device 105. For example, based on the content of speech 110, assistant device 105 can be provided record data 140. Additionally, access server 120 in FIG. 1 can also send additional data to assistant device 105 that can be used to provide audio output in the form of speech asking the user if additional record data should be requested from records database 125. For example, other request types and/or variables might be often requested after speech 110 is answered using record data 140. Thus, access server 120 can generate new data so that assistant device 105 can ask the user whether there is interest to be provided additional information from querying records server 125. This can be a recommended response to the user.

Figure 4:
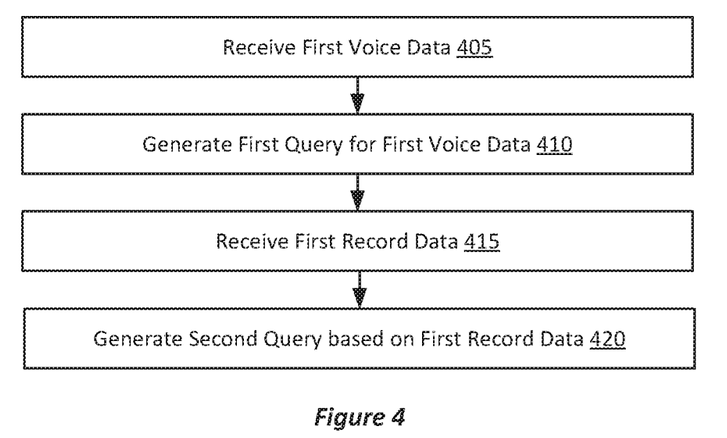
FIG. 4 illustrates an example of a block diagram for generating a query based on record data.

In some implementations, access server 120 can formulate a new data query to provide to records database 125 based on record data 135 or voice data 115. FIG. 4 illustrates an example of a block diagram for generating a query based on record data. In FIG. 4, an access server 120 receive first voice data from an assistant device (405). For example, in FIG. 1, access server 120 can receive first voice data from an assistant device requesting data from records database 125. A first query for the first voice data can then be generated (410) and first record data can be received (415). For example, in FIG. 1, access server 120 can generate query data to be provided to records database 125. This query data can be used by records database 125 to query the databases of records server 125 and used to provide the appropriate record data to access server 120, which can be used to provide feedback using assistant device 105, for example, in the form of speech.

A second query can be generated based on the first record data (420). For example, the content of record data provided by records database 125 regarding the first voice data can be analyzed and a new query can be generated in response to the record data. New record data for the new query can then be received by access server 120, which can be provided to assistant device 105 to provide additional feedback regarding the records in advance. This can be done as a form of predictive feedback because some types of content within the record data might be likely to trigger a user providing new speech data requesting additional record data upon receipt of prior record data.

For example, access server 120 might receive first record data indicating quarterly sales for a business. The first record data can then be provided to assistant device 105 to be provided via speech. However, access server 120 can analyze the content of the first record data and based on that analysis, go ahead and generate a second query data to be provided to records database 125. This can result in records database 125 providing a second record data for the second query data, and access server 120 can provide the second record data to the assistant device 105. For example, if the quarterly sales are below a threshold number, this might be startling to the user of assistant device 105 and the user would likely ask for prior quarterly sales or future prospective quarterly sales. To facilitate ease of use as well as improve speed of the overall system in providing content, access server 120 can go ahead and perform the above determinations and then provide the prior quarterly sales or future prospective quarterly sales to be provided via speech generated by assistant device 105.

The providing of other data stored in records database 125 that the user might not have immediately requested can be a form of artificial intelligence or machine learning-based prediction. For example, if the same type of data (e.g., quarterly sales) exists for different time periods, than the subsequent time period and/or the prior time period to the quarterly sales requested can be predicted to be provided by generating new query data.

In some implementations, the user can use assistant device 105 and access server 120 to generate new records in databases of records server 125. For example, the user can interact with assistant device 105 via speech and ask for a new record to be generated. This request can be provided to access server 120, which can form an instruction or query for records database 125 to generate the new record. For example, the user can use assistant device 105 to generate a new timecard. This request can be provided to records database 125 via access server 120. Records database 125 can then inform access server 120 that the record was generated. Upon that notification, access server 120 can then generate data to be provided to assistant device 105 so that the user can be requested whether information for that record is able to be provided. For example, if the user initially requested that a timecard record be generated to log a time entry for the user's work activities, then access server 120 can determine that the corresponding database record includes several columns of data that should be provided to have a complete timecard record. Thus, access server 120 can then provide data to assistant device 105 to ask the user a variety of questions to fill out the columns of data.

For example, if a timecard record was generated, then the user can be asked one-at-a-time to verbally provide data for the columns of the record. For example, the user can be asked "What day do you want this timecard entry to be for?" and the user can respond with a day. This can be provided to access server 120, as described similarly above, and then used to record the user's response within records database 125, for example, by storing the appropriate data (e.g., the day or date) in the column of the record. Access server 120 can cause assistant device 105 to serially provide questions and record the user's response in the remaining columns of the record until the record is completed (i.e., all of the columns are filled out).

In some implementations, some of the columns of record can be filled by access server 120 without receiving voice data related to a user's speech. For example, access server 120 can request the location of assistant device 105 and use the provided location data to fill out a column of a record in access server 125.

In some implementations, access server 120 can receive both the textual translation of speech 110 in FIG. 1 and the actual audio data of the user speaking. The characteristics of the audio data can be used to adjust how access server 120 provides data to assistant device 105 to have a conversation with the user to access or generate records. For example, if the user is speaking quickly, then access server 120 can provide data to assistant device 105 to ask the user to provide data for two or more columns of a record to be filled. By contrast, if the user is speaking slowly, then access server 120 can request the data for the columns one-at-a-time. This can represent how familiar or how at ease the user is with interacting with assistant device 105 and, therefore, access server 120 can change how the user interacts with assistant device 105 based on the user's familiarity.

As another example, access server 120 can generate a predictive query data to be provided to records database 125 to provide assistant device 105 additional record data based on the characteristics of the audio data (e.g., the characteristics of a user speaking to assistant device 105). For example, if the user speaks quickly, then access server 120 can modify query data 130 in FIG. 1 such that records database 125 would provide more data than the user requested. For example, if the user quickly asks what are the next quarter's sales for Acme Corporation, and access server 120 determines that the user is speaking above a threshold speech speed, then query data provided to records database 125 can include a query to answer the user's request (e.g., the next quarterly sales) as well as a query for the next two quarter sales. In some implementations, the faster the speech, the more queries or variables included for queries, database columns, and/or database records to be searched are included in the query data.

Other characteristics can include language or accents. For example, if the user speaks in one language, then access server 120 can instruct assistant device 105 to ask questions for the user in that language. Similar adjustments can be performed for accents.

In some implementations, the user might want to access a record stored in records server 125 and have assistant device 105 recite the data stored in the record. However, in some scenarios, the user might want different amounts of data to be recited by assistant device 105 at different times. For example, if there are other people within the environment, then the user might not want all of the data in the record to be provided via the audio output of the speaker of assistant device 105. Rather, the user might want sensitive data to not be provided. Thus, in some implementations, access server 120 can request assistant device 105 to determine if other people other than the user are within the environment (e.g., using audio analysis, using a camera and analyzing image frames to determine if other people are depicted in those image frames, etc.), or access server 120 can perform these determinations. Based on the determinations, access server 120 can provide more or less data from records database 125.

In some implementations, characteristics such as the volume of the user's speech can be used by access server 120 to determine how much data should be recited in the audio output of assistant device 105. For example, if the user speaks loudly, then all of the columns of a record can be recited. However, if the user speaks softly, then less than all of the columns of the record can be recited.

Figure 5:
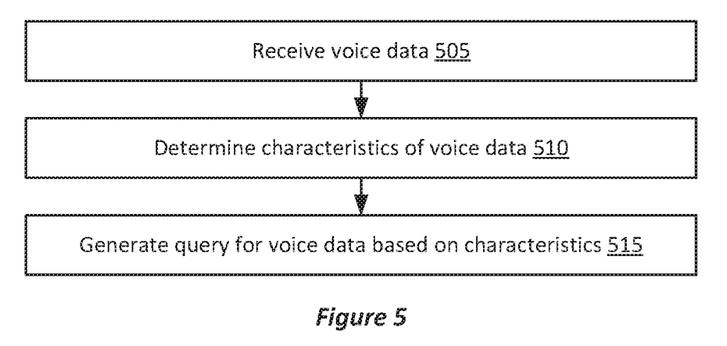
FIG. 5 illustrates an example of a block diagram for generating a query based on characteristics of voice data.

FIG. 5 illustrates an example of a block diagram for generating a query based on characteristics of voice data. In FIG. 5, voice data can be received (505). Characteristics of the voice data can then be determined (510). For example, the language of the speech, speed of the speech, accent of the speech, volume of the speech, or other characteristics can be determined. A query can then be generated based on the voice data and the characteristics (515). For example, the query can be formatted such that records database 125 can provide record data that is requested via voice data. Additionally, the query can be modified to include additional requests for information that were not indicated in the voice data, for example, to include additional data to be provided based on how the user spoke. The additional data can be predicted, as previously discussed.

The identity of the person providing the voice (e.g., the user providing the spoken speech) can be determined and access server 120 can provide assistant device 105 different responses based on the identity of the person. For example, different users can be identified based on how they speak, by logging into a profile, by having a smartphone within the environment of assistant device 105 which can be identified, etc. Access server 120 can then generate query data differently based on the identity of the user.

For example, in prior interactions with assistant device 105, one user can be identified by access server 120 as asking a single question during a session with assistant device 105. Another user might be involved with more back-and-forth with assistant device 105 and, therefore, might ask a series of several questions during a session with assistant device 105. In some implementations, access server 120 can determine this (e.g., whether the user has a history of more back-and-forth with assistant device 105 or not) and then generate query data in response to this. For example, users that have more back-and-forth can be identified and query data for their speech can be generated to include more data to be requested from records database 125. Users that tend to not have as much back-and-forth can be identified and the query data can be generated to receive record data only providing an answer for the question that was asked.

In some implementations, assistant device 105 can include or have access to a camera within the environment of the speech being provided. As a result, any of the determinations using voice can also be performed using image frames that are analyzed to determine various characteristics, attributes, etc. as disclosed herein based on the content of the image frames. For example, the content of the image frames can be analyzed to determine the people within the environment and their identities, the appearance of the person providing speech, the appearance of objects within the environment, activity occurring within the environment, etc.

Figure 3:
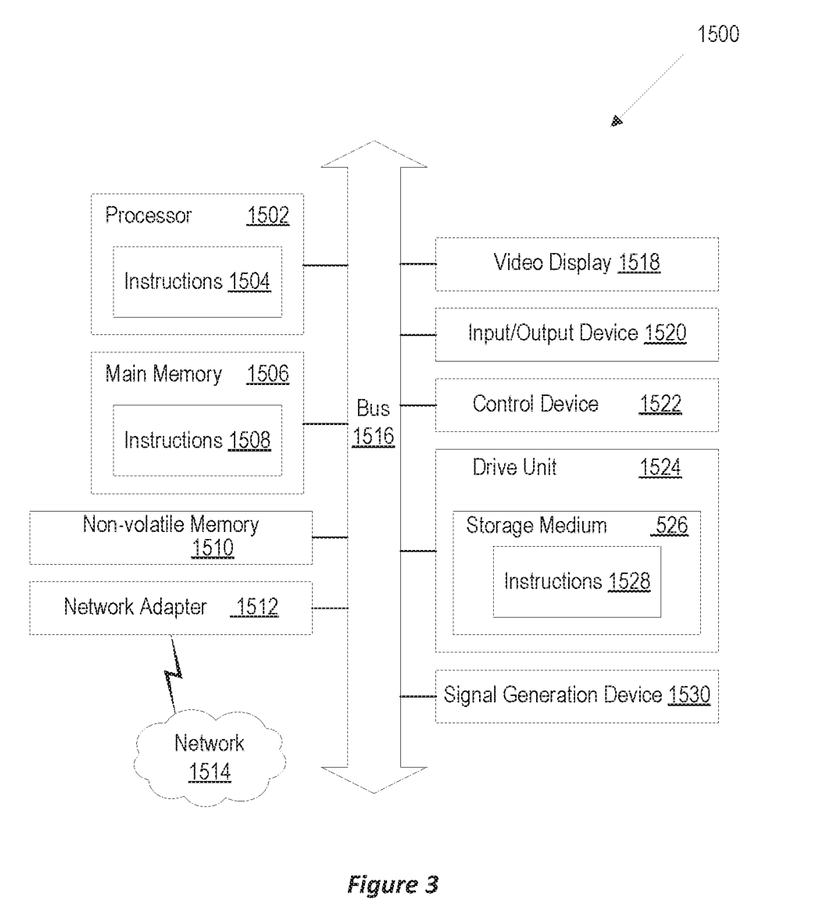
FIG. 3 is a block diagram illustrating a computer operable to implement the disclosed technology according to some embodiments.

FIG. 3 is a block diagram illustrating a computing device operable to implement the disclosed technology according to some embodiments of the present disclosure. For example, FIG. 3 is a block diagram illustrating an example of a processing system 1500 in which at least some operations described herein can be implemented. For example, some components of the processing system 1500 may be used to implement access server 120, assistant device 105, records server 125, as well as perform the functionality and implement the technology described herein.

The processing system 1500 may include one or more central processing units ("processors") 1502, main memory 1506, non-volatile memory 1510, network adapter 1512 (e.g., network interface), video display 1518, input/output devices 1520, control device 1522 (e.g., keyboard and pointing devices), drive unit 1524 including a storage medium 1526, and signal generation device 1530 that are communicatively connected to a bus 1516. The bus 1516 is illustrated as an abstraction that represents one or more physical buses and/or point-to-point connections that are connected by appropriate bridges, adapters, or controllers. The bus 1516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 1500 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1500.

While the main memory 1506, non-volatile memory 1510, and storage medium 526 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1528. The term "machine-readable medium" and "storage medium" shall also be taken to include any medium that is capable of storing, encoding, or carrying a set of instructions for execution by the processing system 500.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in a computing device. When read and executed by the one or more processors 1502, the instruction(s) cause the processing system 1500 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and nonvolatile memory devices 1510, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1512 enables the processing system 1500 to mediate data in a network 514 with an entity that is external to the processing system 1500 through any communication protocol supported by the processing system 1500 and the external entity. The network adapter 1512 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1512 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

I claim:

1. A method comprising:
receiving a first voice data via a video including image frames originating at a camera, the first voice data being indicative of speech provided to an assistant device, the speech requesting first information stored in a database record;
determining a first request type based on the first information, the first request type indicative of a type of data that the speech is requesting;
generating, by a processor, a first query data for requesting the first information stored in the database record based on the first request type, the first query data referencing the database record storing the first information;
determining at an access server a request type and a variable, the request type being configured to identify the variable, the variable being used to form the first query data and also configured to be included in translated text determined from the speech;
providing the first query data to a database server storing the database record;
receiving a first record data from the database server providing the first information;
providing the first information to the assistant device for voice playback in response to the request for the first information; and
determining characteristics of the speech, wherein the first query data is also based on the characteristics of the speech, at least one characteristic of the speech being used to identify a person providing a portion of the speech to identify different users having a history of interacting with the assistant device.

2. The method of claim 1, wherein the characteristics of the speech include one or more of a volume of the speech, a speed of the speech, a language of the speech, or an accent of the speech.

3. The method of claim 1, further comprising:
identifying a person providing the speech, wherein the first query data is also based on the identification of the person providing the speech.

4. The method of claim 1, further comprising:
determining content of the first record data;
generating a second query data based on the first query data and the first record data; and
providing the second query data to the database server storing the database record.

5. The method of claim 4, wherein determining the content of the first record data includes identifying a first time period associated for data included in the content, and the second query data is associated with a second time period different than the first time period for the data.

6. The method of claim 5, wherein the second time period is subsequent to the first time period.

7. An electronic device, comprising:
one or more processors; and
memory storing instructions, wherein the processor is configured to execute the instructions such that the processor and memory are configured to:
receive a first voice data via a video including image frames originating at a camera, the first voice data being indicative of speech provided to an assistant device, the speech requesting first information stored in a database record;

determine a first request type based on the first information, the first request type indicative of a type of data that the speech is requesting;

generate a first query data for requesting the first information stored in the database record based on the first request type, the first query data referencing the database record storing the first information;

determine at an access server a request type and a variable, the request type being configured to identify the variable, the variable being used to form the first query data and also configured to be included in translated text determined from the speech;

provide the first query data to a database server storing the database record;

receive a first record data from the database server providing the first information;

provide the first information to the assistant device for voice playback in response to the request for the first information; and determine characteristics of the speech, wherein the first query data is also based on the characteristics of the speech, at least one characteristic of the speech being used to identify a person providing a portion of the speech to identify different users having a history of interacting with the assistant device.

8. The electronic device of claim 7, wherein the characteristics of the speech include one or more of a volume of the speech, a speed of the speech, a language of the speech, or an accent of the speech.

9. The electronic device of claim 7, wherein the processor is configured to execute the instructions such that the processor and memory are configured to:

identify a person providing the speech, wherein the first query data is also based on the identification of the person providing the speech.

10. The electronic device of claim 7, wherein the processor is configured to execute the instructions such that the processor and memory are configured to:

determine content of the first record data;

generate a second query data based on the first query data and the first record data; and provide the second query data to the database server storing the database record.

11. The electronic device of claim 10, wherein determining the content of the first record data includes identifying a first time period associated for data included in the content, and the second query data is associated with a second time period different than the first time period for the data.

12. The electronic device of claim 11, wherein the second time period is subsequent to the first time period.

13. A computer program product including one or more non-transitory computer-readable media storing computer program instructions, execution of which by a processing system causes the processing system to perform operations comprising:

receive a first voice data via a video including image frames originating at a camera, the first voice data being indicative of speech provided to an assistant device, the speech requesting first information stored in a database record;

determine a first request type based on the first information, the first request type indicative of a type of data that the speech is requesting;

generate a first query data for requesting the first information stored in the database record based on the first request type, the first query data referencing the database record storing the first information;

determine at an access server a request type and a variable, the request type being configured to identify the variable, the variable being used to form the first query data and also configured to be included in translated text determined from the speech;

provide the first query data to a database server storing the database record;

receive a first record data from the database server providing the first information;

provide the first information to the assistant device for voice playback in response to the request for the first information; and determine characteristics of the speech, wherein the first query data is also based on the characteristics of the speech, at least one characteristic of the speech being used to identify a person providing a portion of the speech to identify different users having a history of interacting with the assistant device.

14. The computer program product of claim 13, wherein the characteristics of the speech include one or more of a volume of the speech, a speed of the speech, a language of the speech, or an accent of the speech.

15. The computer program product of claim 13, wherein the processor is configured to execute the instructions such that the processor and memory are configured to:

identify a person providing the speech, wherein the first query data is also based on the identification of the person providing the speech.

16. The computer program product of claim 13, wherein the processor is configured to execute the instructions such that the processor and memory are configured to:

determine content of the first record data;

generate a second query data based on the first query data and the first record data; and provide the second query data to the database server storing the database record.

17. The computer program product of claim 13, wherein determining the content of the first record data includes identifying a first time period associated for data included in the content, and the second query data is associated with a second time period different than the first time period for the data.

* * * * *